(12) United States Patent
Qiao et al.

(10) Patent No.: US 8,135,738 B2
(45) Date of Patent: Mar. 13, 2012

(54) EFFICIENT PREDICATE EVALUATION VIA IN-LIST

(75) Inventors: Lin Qiao, San Jose, CA (US); Vijayshankar Raman, Sunnyvale, CA (US); Frederick Ralph Reiss, Sunnyvale, CA (US); Richard S. Sidle, Mountain View, CA (US); Garret Frederick Swart, Palo Alto, CA (US); F. Ryan Johnson, Lausanne (CH)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 12/195,035

(22) Filed: Aug. 20, 2008

(65) Prior Publication Data

US 2010/0049730 A1 Feb. 25, 2010

(51) Int. Cl.
*G06F 7/00* (2006.01)
*G06F 17/30* (2006.01)
(52) U.S. Cl. .................. 707/776; 707/779; 707/780
(58) Field of Classification Search .................. 707/776, 707/779, 780
See application file for complete search history.

(56) References Cited

U.S. PATENT DOCUMENTS

| 5,778,354 | A | 7/1998 | Leslie et al. |
| 6,983,275 | B2 | 1/2006 | Koo et al. |
| 6,990,484 | B1 * | 1/2006 | Ghazal et al. ................. 707/770 |
| 7,188,098 | B2 | 3/2007 | Chen et al. |
| 7,213,011 | B1 * | 5/2007 | Das ....................................... 1/1 |
| 2006/0248080 | A1 * | 11/2006 | Gray ................... 707/7 |
| 2007/0073647 | A1 * | 3/2007 | Au et al. ........................... 707/2 |
| 2008/0294863 | A1 * | 11/2008 | Faerber et al. ................. 711/170 |

OTHER PUBLICATIONS

Hadjieleftheriou et al., "Complex Spatio-Temporal Pattern Queries," 31st Int'l Conf. on VLDB, 2005, pp. 877-888.
Diao et al., "Path Sharing and Predicate Evaluation for High-Performance XML Filtering," ACM Trans. on Database Systems, Dec. 2003, V28, N4, pp. 467-516.

* cited by examiner

*Primary Examiner* — John R. Cottingham
*Assistant Examiner* — Mariela Reyes
(74) *Attorney, Agent, or Firm* — IP Authority, LLC; Ramraj Soundararajan

(57) ABSTRACT

A predicate over a single column of a table is converted into at least one IN-list, wherein the IN-list is generated for a set of tuples of the column, and the generation is done over a data structure representing a set of distinct values of the column where the predicate applies and having a smaller cardinality than the table. The generated IN-list is evaluated over the set of tuples and the results of the evaluation are outputted as an evaluation of the predicate.

20 Claims, 4 Drawing Sheets

EFFICIENT PREDICATE EVALUATION VIA IN-LIST

BACKGROUND OF THE INVENTION

1. Field of Invention

The present invention relates generally to the field of relational database management systems. More specifically, the present invention is related to generating an IN-list to speed up predicate evaluation, whereby the total cost of evaluating the query (including the cost of the IN-list creation) is reduced.

2. Discussion of Related Art

Complex Business Intelligence (BI) queries are expensive as they often have large number of predicates, some of which can be very complex expressions. Therefore, efficient predicate evaluation is crucial in order to achieve fast BI query response times.

FIG. 1 illustrates an example of a prior art predicate evaluation scheme 100. In the prior art, predicate evaluation of a BI query consists of at least the following overheads: index scan—102, RID-list scan—104, table scan—106, expression calculation—108, decompression (in a compressed dataset)—110, etc. One problem associated with the approach outlined in FIG. 1 is that processing associated with each of the steps can render the process very time-consuming. Another problem associated with the approach of FIG. 1 is that time and resources are spent evaluating complex or expensive predicates for each tuple. Such evaluations do not take advantage of existing data structures that keep the distinct values of one column or multiple columns, such as dictionaries, indexes (i.e., database indexes, wherein a database index is a data structure representing a set of keys and pointers to the instances of that key inside a given column of a table), materialized views, etc. Usually, the number of distinct values of a column or a column group is much smaller than the number of tuples in a table. What is needed is a system, method and article of manufacture that takes advantage of such data structures.

The U.S. patent to Leslie et al. (U.S. Pat. No. 5,778,354) provides for a database management system with improved indexed accessing. Leslie et al. describe the generation of an IN-list based upon applying certain predicates over an index.

The U.S. patent to Koo et al. (U.S. Pat. No. 6,983,275) provides the optimization of database queries, wherein the approach of Koo et al. involves converting predicates with expressions into simpler predicates based on monotonicity of the values in a column.

Whatever the precise merits, features, and advantages of the above cited references, none of them overcomes the technical challenges that the present invention overcomes.

SUMMARY OF THE INVENTION

The present invention provides a computer-based method as implemented in a relational database comprising the steps of: converting a predicate over a single column associated with a table into at least one IN-list, wherein the IN-list comprises values of the column where the predicate applies and the IN-list generated for a set of tuples of the column, and wherein generation of the IN-list is done over a data structure representing a set of distinct values of said column; evaluating the generated IN-list over the set of tuples; and outputting results of evaluating the generated IN-list as an evaluation of said predicate.

The present invention also provides a computer program product comprising a computer usable medium having computer usable program code for evaluating a predicate, the computer program product including: computer usable program code converting a predicate over a single column associated with a table into at least one IN-list, wherein the IN-list comprises values of the column where the predicate applies and the IN-list generated for a set of tuples of the column, and wherein generation of the IN-list is done over a data structure representing a set of distinct values of said column; computer usable program code evaluating the generated IN-list over the set of tuples; and computer usable program code outputting results of evaluating the generated IN-list as an evaluation of said predicate

DESCRIPTION OF THE PREFERRED EMBODIMENTS

Figure 1:
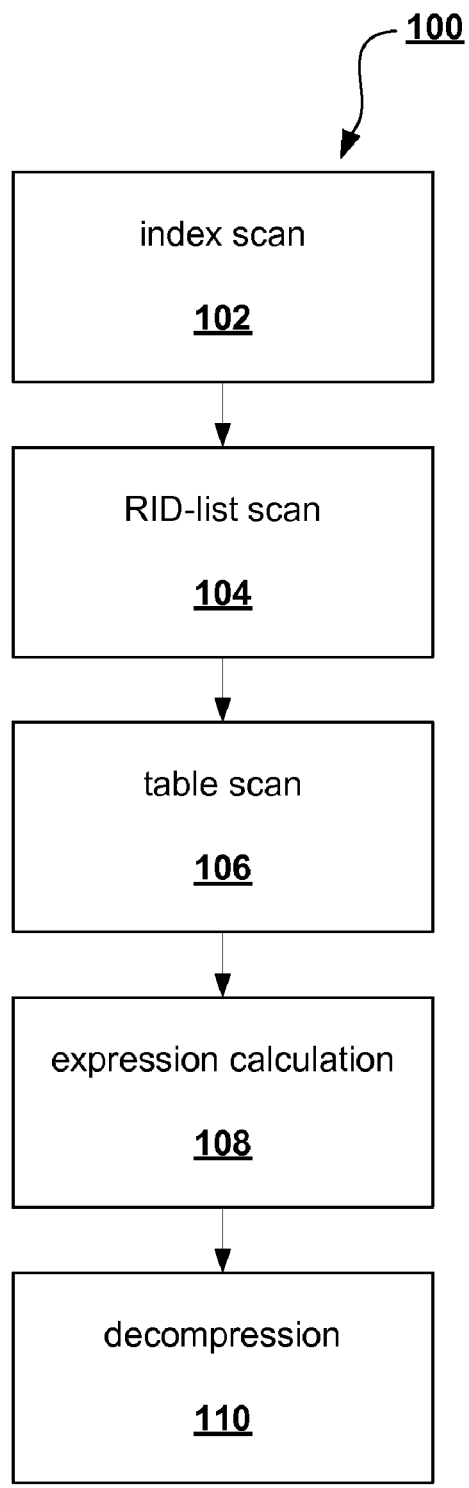
FIG. 1 illustrates an example of a prior art predicate evaluation scheme.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
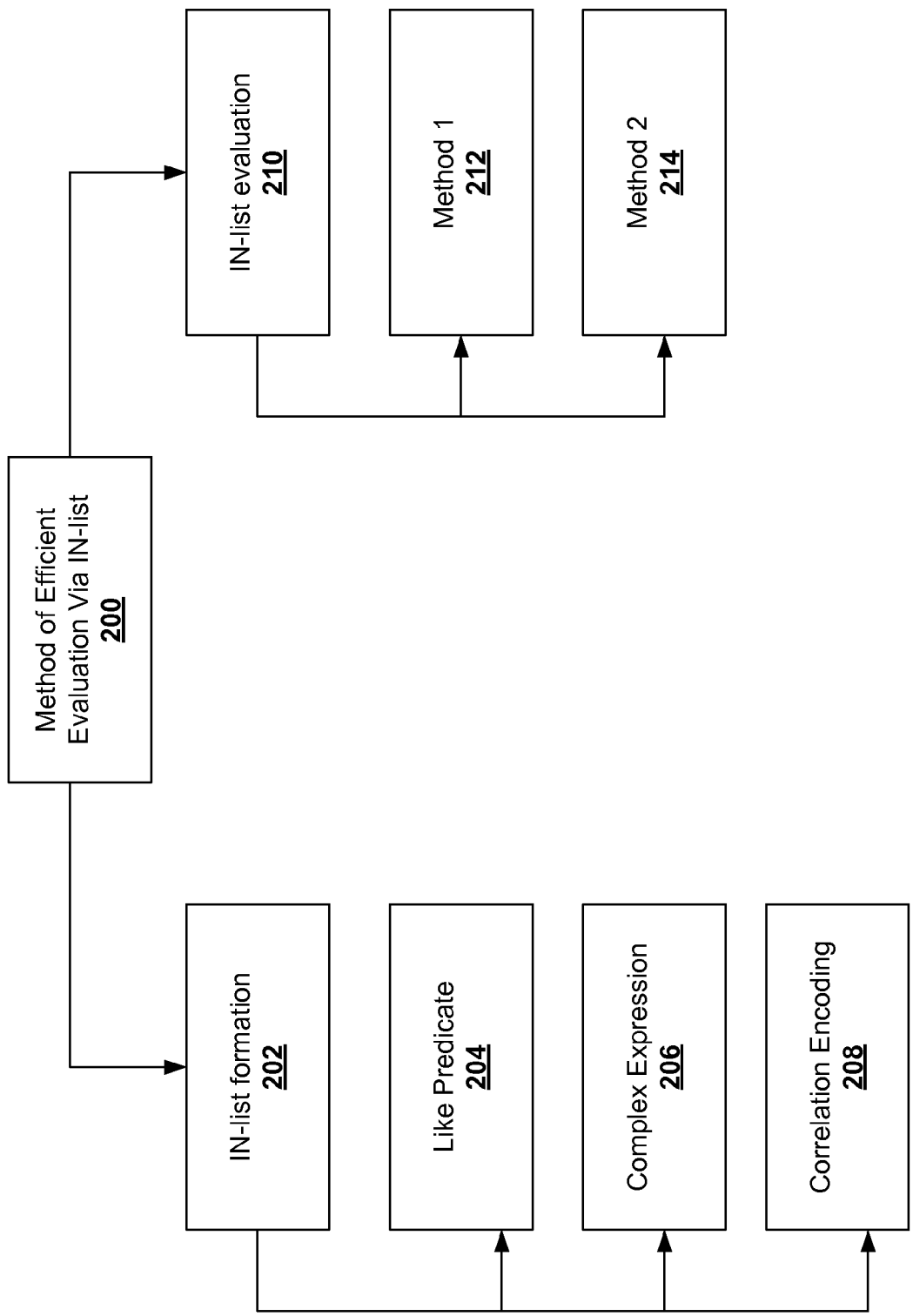
FIG. 2 illustrates an overview of the present invention's method.

FIG. 2 illustrates the present invention's method 200 that comprises two parts—IN-list formation 202 and IN-list evaluation 210. Each of the parts is described below in greater detail.

IN-list Formation—202

A predicate is converted into an IN-list for three cases: 1) like predicates—204, 2) complex expressions—206, and 3) correlation encoded attributes—208.

Like Predicate—204: A like predicate contains wildcard characters, such as % matching zero or more characters. Such matching can be expensive for a like predicate of "% abc % ef %". To evaluate this predicate fast, a list of distinct values of that domain is accessed. In one example, a compression dictionary (in case the column happens to be compressed) is accessed. In another example, an index on the column is accessed. Although specific examples are provided for accessing the list of distinct values, it should be noted that any materialized view that: (1) provides all the distinct values of that column, and (2) has a smaller cardinality than the original table, is considered within the scope of the present invention. A like predicate is, therefore, converted into an IN-list of values, and the IN-list is evaluated for the rows of the table.

Complex Expression—206: Examples of complex expression are "price*(1−0.08)>$100" or "col1+2*col2>col3". For complex expressions on single column, the complex expressions are converted into an IN-list using the distinct values for that column, as in the previous case. For complex expression on multiple columns, the present invention can use: a) distinct values of multiple columns, such as multi-column index, or b) distinct values of each single column. In the case of b), the present invention evaluates the predicate on the cross-product of these distinct values by using a standard join technique like nested-loop join. In addition, if the predicate is of the form f(col1)=g(col2), the present invention does a hash or sort-merge join by applying f and g respectively to the list of distinct values of col1 and col2.

Correlation Encoding—208: Correlation encoding schemes compress correlated attributes so that a) it allows efficient predicate evaluation on each individual attribute, and b) it still achieves good compression. However, one problem with traditional co-coding schemes (Co-coding, as referred to here, involve coding, schemes that compress multiple columns using one dictionary, rather than one dictionary for each column; multiple columns in a row are encoded using one code from a dictionary, wherein these columns have strong correlation with each other, and whereby encoding them together is much more compact than encode them separately) is that they are very inefficient in query processing because these schemes needs to uncompress co-coded columns to apply predicates.

The present invention's coding scheme works by clustering the data values from correlated columns. After clustering is formed, each column is individually coded by the cluster id and the offset in the cluster.

Correlation encoding is another way to exploit column correlations and achieve good compression ratio. Compared with co-coding, correlation encoding has lower compression ratio, but better query performance. Correlation encoding partitions a multi-dimensional domain into clusters, and represents each data point using cluster ID and offset within a cluster. Then, the cluster ID and offset of data points are compressed independently. For a predicate on a correlation encoded column, such as "col2>15", it is converted into "(cluster_ID offset) IN list1". Here, list1 contains two columns, one for cluster identifier (ID) and the other for the offset within a cluster. For each row, a test is performed as to whether its cluster_ID is in list1 or not. If the cluster_ID is present in list1, another test is performed to see if its offset>the second value in list1.

IN-List Predicates are Evaluated in the Following Ways

Method 1—212: Two IN-lists are constructed when applying predicates to distinct values in dictionaries, indexes or material views. The first IN-list contains qualifying values while the second list—called NOT-IN-list—contains values that do not qualify. Method 1 dynamically chooses which one of the lists to use for IN-list evaluation based on the size of the IN-list. If the NOT-IN-list is smaller than the IN-list, the predicate is converted into "NOT IN NOT-IN-list" rather than "IN IN-list".

Method 2—214: If the maximum IN-list size in a query is small (<5), the present invention evaluates such IN-lists simultaneously. The idea is to pad all the IN-lists to the size of the largest IN-list, then the present invention loops through all the IN-lists simultaneously using, for example, non-leaky SIMD predicate evaluation technology (please see assignee-related disclosure titled "Method for Evaluating a Conjunction of Equity and Range Predicates using a Constant Number of Operations"—U.S. Ser. No. 12/056,999 filed 27 Mar. 1997, the specification of which is incorporated in its entirety).

Otherwise, the standard solution of looping through the IN-list to evaluate the existence of one value becomes inefficient. Instead, at the beginning of query execution a data structure is computed as follows:

compute data density in an IN-list as number of values in an IN-list divided by a max value-min value of that IN-list; if the values are compressed, then this is done on the encoded value, otherwise, it applies only to integer data types.

if density>$1/64$ (or 1/C, where C is constant factor that is proportional to the number of bits used for storing a value from the domain of the column), the values are stored as a bitmap implemented as an array of integers, else a perfect hash table is generated containing all the items in the IN-list, wherein this hash function is guaranteed to be collision-free, with a space which is equal to C/2 multiplied by a number of entries bits multiplied by 2, where C, as above, is a constant factor that is proportional to the number of bits used for storing a value from the domain of the column) (each entry needs to store the value, so that it takes up 32 bits assuming number of distinct values is under $2^{32}$, wherein the factor 2 is a fudge factor to make perfect hash function generation efficient).

for each tuple, the value in the corresponding column is extracted and a check is performed for containment in the above data structure.

One or more perfect hash functions can be generated based on the data in the IN-list. Such method has tradeoffs with regard to the cost of generating perfect hash functions and the cost of lookup hash tables. More specifically, finding a single perfect hash function is more difficult than finding two or more perfect hash functions which are collision-free. But the former has one random lookup compared with two or more random lookups for the latter. The present invention adaptively chooses perfect hash functions in the following way: (1) if one perfect hash function can be found, it is used for IN-list evaluation, else (2) two perfect hash functions are found and used for IN-list evaluation, and (3) if two perfect hash functions cannot be found, a chaining hash table is used.

Applying the expensive predicates on the distinct values is more efficient than applying them to all the tuples. The present invention's approach involves, first, converting predicates into an IN-list of qualifying values and, then, applying such IN-list predicate to each tuple. Also proposed is an efficient way to evaluate IN-list predicates. IN-list evaluation is to test containment of a value in a set of values. For a number of short IN-lists, the present invention proposes to apply them simultaneously to save CPU cycles. For long IN-lists, a bitmap or a perfect hash table is used to test for containment and to avoid collisions and branching.

The present invention's approach is superior when the column cardinality is much smaller than the table cardinality. The present invention outperforms traditional technique of predicate evaluation in the following aspects: 1) converting into IN-list is efficient using distinct values, and 2) IN-list is very efficient to evaluate. In general, the present invention's technique can be applied to compressed dataset, tables with indexes, tables with materialized view, etc. Two examples are provided of possible applications of the proposed technology. For compressed data, the present invention avoids the expensive decompression overhead for each predicate column of each tuple. A predicate is first applied to the distinct values in a dictionary and an IN-list of codes is formed for qualifying values. During a table scan or an index scan, a compressed value of a field is compared directly with the compressed values in the newly formed IN-list. For complex expression involving mathematical functions, the index is scanned and the complex expression is applied to the distinct values in the index. An IN-list is formed of distinct values if the size of such IN-list is much smaller than RID-list or, otherwise, an IN-list of RIDs is formed. The newly formed IN-list is used to verify whether each row qualifies.

Additionally, the present invention provides for an article of manufacture comprising computer readable program code contained within implementing one or more modules to efficiently execute predicate evaluation using an IN-list. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Figure 3A:
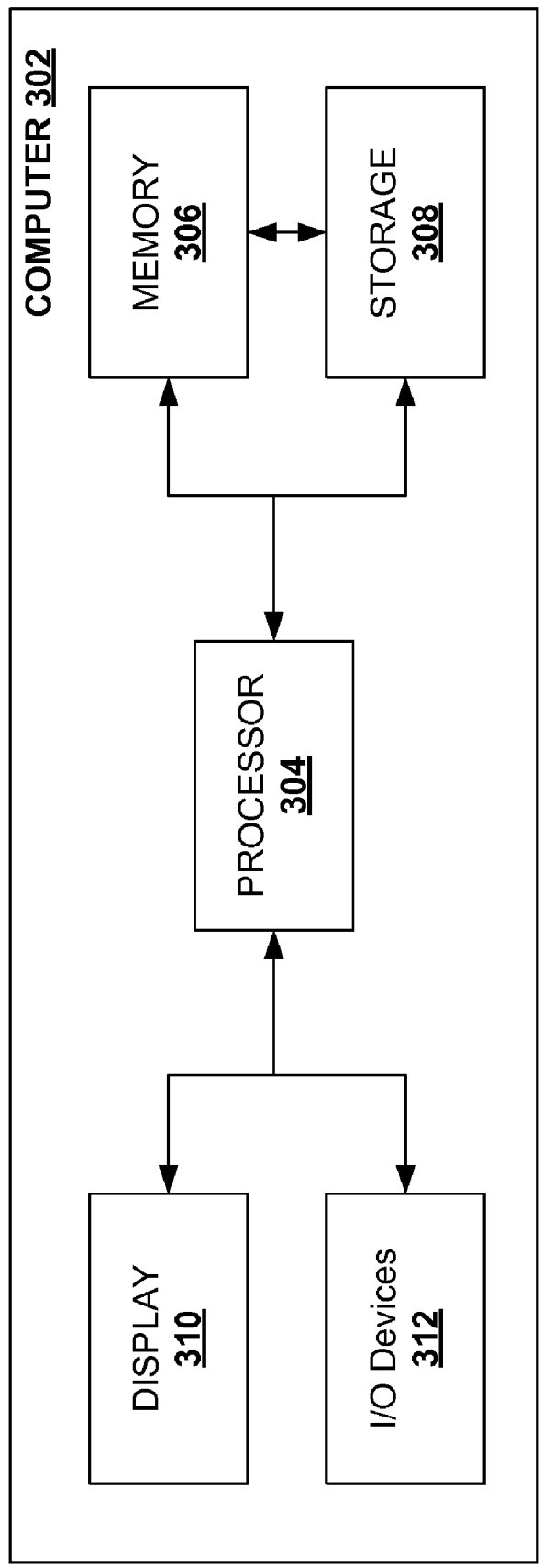
FIG. 3a illustrates a computer-based system used for effective predicate evaluation using an IN-list.

The present invention also provides a computer-based system 302, as shown in FIG. 3a, for effective predicate evaluation using an IN-list. The computer system shown in FIG. 3a comprises processor 304, memory 306, storage 308, display 310, and input/output devices 312. Storage 308 stores computer readable program code implementing one or more modules for effective predicate evaluation using an IN-list.

Figure 3B:
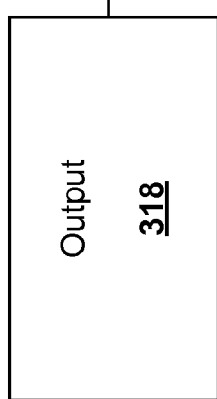
FIG. 3b illustrates software modules that are implemented using computer readable program code for effective predicate evaluation using an IN-list.
Figure 3B:
Figure 3B:
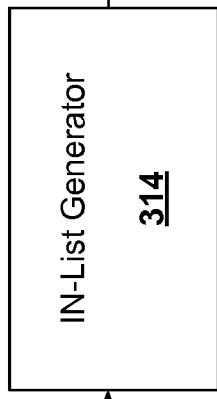

FIG. 3b illustrates one embodiment wherein storage 308 stores first 314, second 316, and third 318 modules, each of which are implemented using computer readable program code. The first module 314 implemented in computer readable program code is a IN-List generator module 314 that converts a predicate over a single column associated with a table into at least one IN-list, wherein the IN-list comprises values of the column where the predicate applies and the IN-list being generated for a set of tuples of the column, with the generation being done over a data structure representing a set of distinct values of the column (wherein the data structure can additionally have a smaller cardinality than the table). The second module 316 implemented in computer readable program code is an IN-list evaluator 316 that evaluates the generated IN-list over the set of tuples. The third module 318 implemented in computer readable program code is an output module 318 that aids in outputting results of the evaluated IN-list as an evaluation of the predicate.

CONCLUSION

A system and method has been shown in the above embodiments for effective predicate evaluation using an IN-list. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by how the distinct values of a column are accessed, software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of relational database management systems.

The invention claimed is:

1. A computer-based method as implemented in a relational database, said method implemented by a processor by executing instructions stored in a computer storage, said computer-based method implemented by processor comprising:
    said processor executing instructions to convert a predicate over a single column associated with a table into at least one IN-list, said IN-list comprising values of said column where said predicate applies and said IN-list generated for a set of tuples of said column, wherein generation of said IN-list is done over a data structure representing a set of distinct values of said column;
    said processor executing instructions to evaluate said generated IN-list over said set of tuples, said evaluating further comprising the steps of: computing a data density in an IN-list as number of values in an IN-list divided by a max value-min value of that IN-list, and if the density>1/C, where C is a constant factor that is proportional to a number of bits used for storing a value from a domain of said column, the values are stored as a bitmap implemented as an array of integers, else a perfect hash table is generated containing all the items in the IN-list with a space which is equal to C/2 multiplied by a number of entries bits multiplied by 2; and for each tuple, said processor executing instructions to extract the value in the corresponding column and checking for containment in the above data structure; and
    said processor executing instructions to output results of said evaluating said generated IN-list as an evaluation of said predicate.

2. The computer-based method of claim 1, wherein said data structure has a smaller cardinality than said table.

3. The computer-based method of claim 1, wherein said data structure is a materialized view comprising distinct values.

4. The computer-based method of claim 1, wherein said column is a compressed column and said data structure is a compression dictionary associated with said compressed column.

5. The computer-based method of claim 1, wherein said data structure is a database index on said column.

6. The computer-based method of claim 1, wherein said predicate is a like predicate on said column.

7. The computer-based method of claim 1, wherein said predicate is a complex expression on a plurality of columns, and said IN-list is generated from a multi-column index containing distinct values of said plurality of columns.

8. The computer-based method of claim 1, wherein said predicate is a complex expression on a single column, and said IN-list is generated from a single-column index.

9. The computer-based method of claim 1, wherein
    said predicate is a complex expression on a plurality of columns,
    said IN-list comprises distinct values of each column in said plurality of columns, and
    said evaluating comprises evaluating a cross-product of distinct values by a join technique.

10. The computer-based method of claim 1, wherein said predicate is associated with a correlation encoded scheme and said computer-based method further comprises:
    clustering data values from correlated columns; and
    individually coding each column by its cluster id and its offset in the cluster.

11. The computer-based method of claim 3, wherein said evaluation further comprises constructing two IN-lists when applying predicates to distinct values in said materialized view, the first IN-list containing qualifying values while the second list containing values that do not qualify, said computer-based method dynamically choosing which one of the two lists to use for IN-list evaluation based on a size of the IN-list.

12. The computer-based method of claim 1, wherein said evaluation further comprises padding a plurality of IN-lists to the size of the largest IN-list and simultaneously evaluating said plurality of IN-lists.

13. A computer program product comprising:
a non-transitory computer usable medium having computer usable program code for evaluating a predicate, said computer program product including:
computer usable program code converting a predicate over a single column associated with a table into at least one IN-list, said IN-list comprising values of said column where said predicate applies and said IN-list generated for a set of tuples of said column, wherein generation of said IN-list is done over a data structure representing a set of distinct values of said column;
computer usable program code evaluating said generated IN-list over said set of tuples, said evaluating further comprising the steps of: computing a data density in an IN-list as number of values in an IN-list divided by a max value-min value of that IN-list, and if the density>1/C, where C is a constant factor that is proportional to a number of bits used for storing a value from a domain of said column, the values are stored as a bitmap implemented as an array of integers, else a perfect hash table is generated containing all the items in the IN-list with a space which is equal to C/2 multiplied by a number of entries bits multiplied by 2; and for each tuple, extracting the value in the corresponding column and checking for containment in the above data structure; and
computer usable program code outputting results of said evaluating said generated IN-list as an evaluation of said predicate.

14. The computer program product of claim 13, wherein said data structure has a smaller cardinality than said table.

15. The computer program product of claim 13, wherein said data structure is a materialized view comprising distinct values.

16. The computer program product of claim 13, wherein said column is a compressed column and said data structure is a compression dictionary associated with said compressed column.

17. The computer program product of claim 13, wherein said data structure is a database index on said column.

18. The computer program product of claim 13, wherein said predicate is associated with a correlation encoded scheme and said medium further comprising the steps of:
computer readable program code clustering data values from correlated columns; and
computer readable program code individually coding each column by its cluster id and its offset in the cluster.

19. The computer program product of claim 15, wherein said evaluation further comprises constructing two IN-lists when applying predicates to distinct values in said materialized view, the first IN-list containing qualifying values while the second list containing values that do not qualify, said computer-based method dynamically choosing which one of the two lists to use for IN-list evaluation based on a size of the IN-list.

20. A system comprising:
a processor; and
a non-transitory storage medium storing computer readable computer code executed by said processor to implement a method in a relational database comprising,
wherein said processor executing computer readable program code stored in said non-transitory storage medium to convert a predicate over a single column associated with a table into at least one IN-list, said IN-list comprising values of said column where said predicate applies and said IN-list generated for a set of tuples of said column, wherein generation of said IN-list is done over a data structure representing a set of distinct values of said column;
said processor executing computer readable program code stored in said non-transitory storage medium to evaluate said generated IN-list over said set of tuples, said evaluating further comprising the steps of: said processor executing computer readable program code to compute a data density in an IN-list as number of values in an IN-list divided by a max value-min value of that IN-list, and if the density>1/C, where C is a constant factor that is proportional to a number of bits used for storing a value from a domain of said column, the values are stored as a bitmap implemented as an array of integers, else a perfect hash table is generated containing all the items in the IN-list with a space which is equal to C/2 multiplied by a number of entries bits multiplied by 2; and for each tuple, said processor executing computer readable program code stored in said non-transitory storage medium to extract the value in the corresponding column and checking for containment in the above data structure; and
said processor executing computer readable program code stored in said non-transitory storage medium to output results of said evaluating said generated IN-list as an evaluation of said predicate.

* * * * *